US008489756B2

(12) United States Patent  (10) Patent No.: US 8,489,756 B2
Xu  (45) Date of Patent: Jul. 16, 2013

(54) METHOD, APPARATUS, AND SYSTEM FOR RELEASING RESOURCES

(75) Inventor: Changjiu Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/361,380

(22) Filed: Jan. 30, 2012

(65) Prior Publication Data

US 2012/0131207 A1 May 24, 2012

Related U.S. Application Data

(63) Continuation of application No. PCT/CN2010/075783, filed on Aug. 6, 2010.

(30) Foreign Application Priority Data

Aug. 7, 2009 (CN) .......................... 2009 1 0162023

(51) Int. Cl.
*G06F 15/173* (2006.01)

(52) U.S. Cl.
USPC .......................... 709/229; 455/408; 455/435.1

(58) Field of Classification Search
USPC .......................... 709/229; 455/408, 435.1, 455
See application file for complete search history.

(56) References Cited

U.S. PATENT DOCUMENTS

| 7,441,269 | B2 * | 10/2008 | Jones et al. ..................... 726/14 |
| 7,680,482 | B2 * | 3/2010 | Bhatt et al. ..................... 455/406 |
| 8,139,520 | B2 * | 3/2012 | Haverinen et al. ............ 370/328 |
| 2007/0185809 | A1 | 8/2007 | Duan |
| 2008/0046573 | A1 | 2/2008 | Ropolyi et al. |
| 2008/0102829 | A1 * | 5/2008 | Jiang ............................. 455/433 |
| 2008/0281973 | A1 * | 11/2008 | Yang ............................. 709/228 |

FOREIGN PATENT DOCUMENTS

| CN | 1773922 A | 5/2006 |
| CN | 1961567 A | 5/2007 |
| CN | 101075887 A | 11/2007 |
| CN | 101111071 A | 1/2008 |
| CN | 101179402 A | 5/2008 |
| CN | 101188871 A | 5/2008 |
| CN | 101267480 A | 9/2008 |
| EP | 1 760 932 A1 | 3/2007 |
| WO | WO 2006/050669 A1 | 5/2006 |

OTHER PUBLICATIONS

Written Opinion of the International Searching Authority dated Nov. 18, 2010 in connection with International Patent Application No. PCT/CN2010/075783.
Supplementary European Search Report dated Mar. 30, 2012 in connection with European Patent Application No. EP 10 80 6058.
International Search Report dated Nov. 18, 2010 in connection with International Patent Application No. PCT/CN2010/075783.
Search Report dated Oct. 24, 2012 in connection with Chinese Patent Application No. 2009101620231.

\* cited by examiner

*Primary Examiner* — Kevin Bates

(57) ABSTRACT

Embodiments of the present invention disclose a method, an apparatus, and a system for releasing resources. The method includes: querying a reservation record according to information about a current session; judging whether a reservation record exists according to a result of the query; judging whether a conflicting session exists according to reservation information in the reservation record if the reservation record exists; obtaining reservation information of the conflicting session if the conflicting session exists, and releasing a corresponding reserved service unit according to the reservation information of the conflicting session; and reserving a service unit for the current session, storing reservation information of the current session, and forming a reservation record for the current session if no reservation record exists or no conflicting session exists or the corresponding reserved service unit is released.

14 Claims, 4 Drawing Sheets

METHOD, APPARATUS, AND SYSTEM FOR RELEASING RESOURCES

CROSS-REFERENCE TO RELATED APPLICATIONS

This application is a continuation of International Application No. PCT/CN2010/075783, filed on Aug. 6, 2010, which claims priority to Chinese Patent Application No. 200910162023.1, filed on Aug. 7, 2009, both of which are hereby incorporated by reference in their entireties.

TECHNICAL FIELD

The present invention relates to the field of mobile communications, and in particular, to a method, an apparatus, and a system for releasing resources.

BACKGROUND

In an online charging system (Online Charging System, OCS) of an existing CDMA (Code Division Multiple Access, code division multiple access) network, online charging is performed by an SCP (Service Control Point, service control point) that exchanges messages with the OCS through a CCR (Credit Control Request, credit control request)/CCA (Credit Control Answer, credit control answer) procedure.

After a calling party initiates a call, an SSP (Service Switching Point, service switching point) reports an ORREQ message to the SCP, and the SCP sends a CCR Initial (CCR initial) request message to the OCS. The CCR Initial request message includes requested service units (such as call duration and traffic). The OCS creates a session according to the CCR Initial request message, performs authentication, and reserves a balance after rating the requested service units. If the balance is reserved successfully, the OCS returns a CCA Initial response message to the SCP, where the CCA Initial response message carries granted service units (such as call duration and traffic). After receiving the CCA Initial response message, the SCP delivers an orreq (continue to call) message to a mobile switching center, and the called party rings. After the called party picks up the phone, the SSP reports an OANSWER message to the SCP, and begins a conversation.

The SCP sends a CCDIR message to the SSP at intervals (such as 5 minutes) to check whether a call exists. The SSP returns a ccdir response message to the SCP, and the SCP, through a CCR Update (CCR update) message, reports the used service unit to the OCS, and requests a new reserved service unit. The OCS deducts a fee, reserves a next service unit, and returns a CCA Update message to the SCP. Such steps occur repeatedly in a conversation process.

After a user (including a calling party or a called party) hangs up, the SSP sends an ODISCONNECT message to the SCP, and the SCP sends a CCR Termination (CCR termination) message to the OCS to report the final used service unit. The OCS deducts a fee and releases the session, and returns a CCA Termination message to the SCP. The SCP returns an odisconnect response message to the SSP to end the session.

For example, after user A initiates a call to user B, the OCS creates a session, performs rating, and reserves a service unit in the account of user A. If user A hangs up initiatively before user B puts through the call, the SSP reports no message to the SCP, and the SCP cannot send any CCR Termination message to the OCS, and the reserved service unit on the OCS cannot be released in time. Upon timeout (expiry of a timeout period of 15 seconds, for example), the SCP initiatively sends a CCDIR message to query the SSP and obtain the state, and then can report a CCR Termination message to the OCS.

In a timeout period (such as 15 seconds), when user A initiates a call to other users again, since the balance is partly reserved for a previous session, a possibility that the balance may be not enough to initiate a call exists, which reduces the call completion rate and affects the service for the end user.

SUMMARY

Embodiments of the present invention provide a method, an apparatus, and a system for releasing resources, which can solve a problem that in an online charging process of a CDMA network, a resource is reserved, and cannot be released in time when a user initiates multiple calls continuously.

To achieve the above objective, embodiments of the present invention adopt the following technical solutions.

A method for releasing resources includes:

querying a reservation record according to information about a current session;

judging whether a reservation record exists according to a result of the query;

judging whether a conflicting session exists according to reservation information in the reservation record if the reservation record exists;

obtaining reservation information of the conflicting session if the conflicting session exists, and releasing a corresponding reserved service unit according to the reservation information of the conflicting session; and reserving a service unit for the current session, storing reservation information of the current session, and forming a reservation record for the current session if no reservation record exists or no conflicting session exists or the corresponding reserved service unit is released.

An apparatus for releasing resources includes:

a querying module, configured to query a reservation record according to information about a current session;

a processing module, configured to: judge whether a reservation record exists according to a query result of the querying module, judge whether a conflicting session exists according to reservation information in the reservation record if the reservation record exists, obtain reservation information of the conflicting session if the conflicting session exists, and release a corresponding reserved service unit according to the reservation information of the conflicting session; and a reserving module, configured to reserve a service unit for the current session, store reservation information of the current session, and form a reservation record for the current session if the querying module finds no reservation record, or if the processing module judges that no conflicting session exists, or if the processing module releases the corresponding reserved service unit.

A system for releasing resources includes a resource releasing apparatus and an service control point, where:

the resource releasing apparatus is configured to: query a reservation record according to information about a current session after receiving a credit control request message sent by the service control point; judge whether a reservation record exists according to a result of the query; judge whether a conflicting session exists according to reservation information in the reservation record if the reservation record exists; obtain reservation information of the conflicting session if the conflicting session exists, release a corresponding reserved service unit; and reserve a service unit for the current session, store reservation information of the current session, and form a reservation record for the current session if no reservation record exists or no conflicting session exists or the corresponding reserved service unit is released; and the service control point is configured to send the credit control request message to the resource releasing apparatus according to a session initiated by a user, and control the current session according to a credit control result returned by the resource releasing apparatus.

According to the method, the apparatus, and the system for releasing resources provided in the embodiments of the present invention, conflicting sessions are detected before a service unit is reserved for the current session. If a conflicting session is detected, the reserved service unit of the conflicting session is cleared, and a service unit is reserved for the current session. The reservation information of the current session is stored, so as to facilitate conflicting session detection for the next session. According to the technical solution provided in the embodiments of the present invention, when a user initiates multiple calls continuously, the reserved service unit of the conflicting session is released in time, so that the current session can be put through smoothly, and the call completion rate of the user is improved.

DETAILED DESCRIPTION

A method, an apparatus, and a system for releasing resources according to the embodiments of the present invention are described in detail below with reference to the accompanying drawings.

Figure 1:
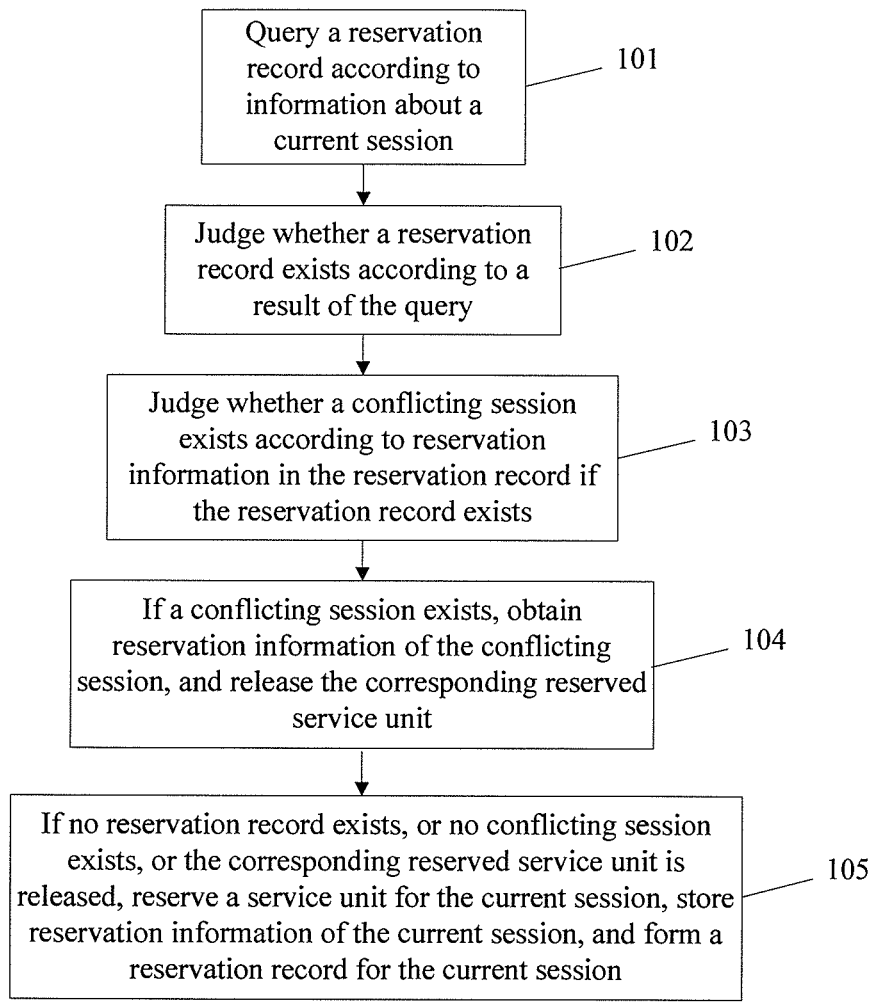
FIG. 1 is a schematic flow chart of a method for releasing resources according to an embodiment of the present invention.

As shown in FIG. 1, an embodiment of the present invention provides a method for releasing resources, where the method may include the following steps.

101: Query a reservation record according to information about a current session.

Figure 2:
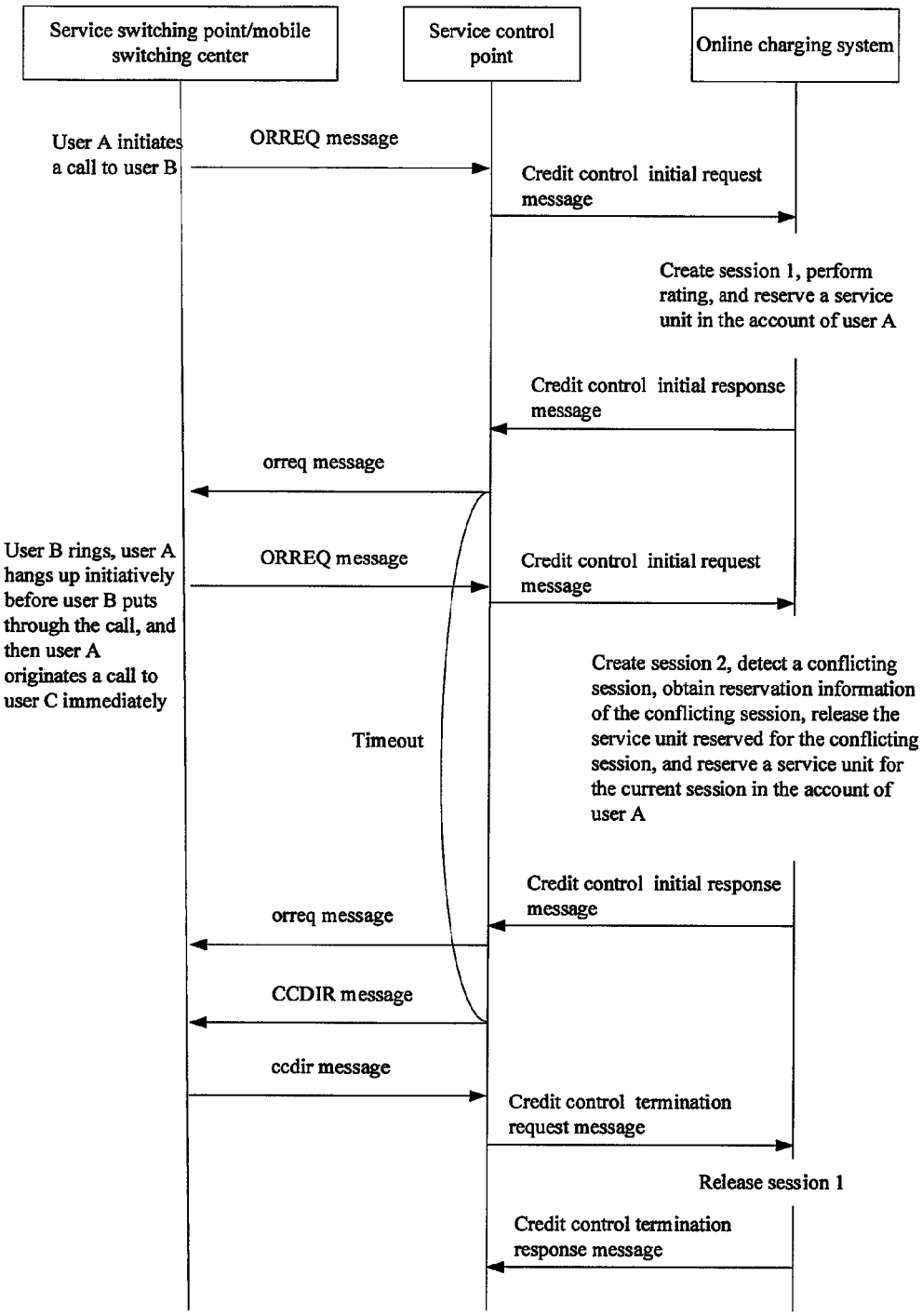
FIG. 2 is a schematic flow chart of exchanging messages in an online charging process in a CDMA network.

In a specific example, the information about the current session may include a user identifier of the current session, and the reservation record is queried according to the user identifier of the current session. This step may occur in the following scenario: As shown in FIG. 2, a CDMA network is taken as an example here, and the OCS processing is the same in other networks. In the OCS, user A initiates a call to user B; after the SSP or the MSC (Mobile Switching Center, mobile switching center) reports an ORREQ message to the SCP, the SCP sends a CCR Initial message to the OCS. The OCS creates session 1, performs rating, reserves a service unit in the account of user A, and then returns a CCA Initial message to the SCP. The SCP delivers an orreq message to the SSP or MSC, and user B rings. If user A hangs up initiatively before user B puts through the call, the SSP or MSC reports no message to the SCP, the SCP cannot send any CCR Termination message to the OCS, and the service unit reserved for session 1 on the OCS cannot be released in time temporarily. If user A initiates a call to user C immediately, the SSP or MSC reports an ORREQ message to the SCP again. The SCP sends a CCR Initial message to the OCS, and the OCS creates session 2, that is, the current session. At this time, the OCS detects the conflicting session, and starts to perform step 101. The OCS queries the reservation record in the OCS according to the information about session 2, that is, the current session. Because session 2 is created as a result of dialing by user A, the reservation record in the OCS specifically may be queried according to the identifier of user A.

102: Judge whether a reservation record exists according to a result of the query.

103: Judge whether a conflicting session exists according to reservation information in the reservation record if the reservation record exists.

In a specific example, the reservation information may include a user identifier, event service characteristics, and a reservation transaction identifier. Accordingly, this step specifically may be: if a reservation record exists, obtaining event service characteristics in the reservation record, and judging whether a conflicting session exists according to the event service characteristics of the current session and the event service characteristics in the obtained reservation record. A specific judging process may be: judging that a conflicting session exists if the event service characteristics of the current session are the same as the event service characteristics in the obtained reservation record; the judging process may also be: querying a service characteristics conflict table according to the event service characteristics of the current session and the event service characteristics in the obtained reservation record, and determining whether any conflicting session exists according to the query result.

Judging whether a conflicting session exists by querying a service characteristics conflict table (as shown in Table 1 below) according to the event service characteristics of the current session and the event service characteristics in the obtained reservation record, which specifically may be: querying an event service characteristics conflict table according to the event service characteristics of the current session and the event service characteristics in the obtained reservation record, and determining whether any conflicting session exists according to the query result. An event service characteristic refers to a service type that can distinguish between charging events, such as a voice charging event, GPRS (General Packet Radio Service, general packet radio service) charging event, and SMS (Short Messaging Service, short message service) charging event. The event service characteristics conflict table may be stored in the OCS, and the event service characteristics conflict table may also be obtained from an external storage apparatus by the OCS, or a query result is obtained by querying the external storage apparatus directly, and the session conflict is determined according to the query result. The event service characteristics conflict table is used for describing whether a conflict exists among the event service characteristics. Each conflict rule is formed by event service characteristics of an established session, event service characteristics of the current session, and a result. The result is either "conflict" or "no conflict". An example is as shown in Table 1:

TABLE 1

| Session Current Session | Established | | |
|---|---|---|---|
| | Event Service Characteristic A | Event Service Characteristic B | ... |
| Event Service Characteristic A | Conflict | No conflict | ... |
| Event Service Characteristic B | No conflict | Conflict | ... |
| ... | ... | ... | ... |

By querying the event service characteristics conflict table, if a returned result indicates that no conflicting session exists, the procedure proceeds to step 105; if the returned result indicates that a conflicting session exists, the procedure proceeds to step 104.

It should be noted that, in another specific example, when multiple reservation records are found, a specific process of step 103 may be: obtaining event service characteristics in the first reservation record, and judging whether a conflicting session exists according to the event service characteristics of the current session and the event service characteristics in the obtained reservation record. A specific judging process is the same as that described above. If a judging result is that no conflicting session exists, judge whether the current reservation record is the last reservation record; if the current reservation record is not the last reservation record, obtain a next reservation record next to the current reservation record, and judge whether a conflicting session exists according to the event service characteristics of the current session and the event service characteristics in the obtained next reservation record; if no conflicting session exists, further obtain a next reservation record until the last reservation record; if a conflicting session exists, proceed to step 104.

104: If a conflicting session exists, obtain reservation information of the conflicting session, and release the corresponding reserved service unit.

If a returned result of the query indicates a conflicting session, obtain reservation information of the conflicting session, and release the corresponding reserved service unit according to the reservation transaction identifier in the reservation information. For example, in the solution shown in FIG. 2, the OCS finds that session 1 conflicts in the reservation record, and therefore, the OCS obtains the reservation information of session 1, and releases the service unit reserved for session 1 in the account of user A according to the reservation transaction identifier in the reservation information.

105: If no reservation record exists, or no conflicting session exists, or the corresponding reserved service unit is released, reserve a service unit for the current session, store reservation information of the current session, and form a reservation record for the current session.

If it is judged that no reservation record exists in step 102, or, if it is judged that no conflicting session exists in step 103, or, if the corresponding reserved service unit is released in step 104, the OCS reserves a service unit for the current session in the user account, stores reservation information of the current session, and forms a reservation record for the current session.

For example, in the solution shown in FIG. 2, the OCS performs rating for session 2, and reserves a service unit for session 2 in the account of user A. The OCS stores the reservation information of the current session, including identifier of user A, event service characteristics, and reservation transaction identifier; and forms a reservation record for the current session. Afterward, the OCS returns a CCA Initial message to the SCP.

In another method embodiment provided in the present invention, the method may further include: receiving a CCR Termination message reported by the SCP. Specifically, as shown in FIG. 2, upon timeout (expiry of a timeout period of 15 seconds, for example), the SCP initiatively sends a CCDIR message to query the SSP; the SSP returns a ccdir response message to the SCP; and the SCP obtains the state of session 1, and reports a CCR Termination message to the OCS.

The OCS releases session 1, and then returns a CCA Termination message to the SCP.

In another method embodiment of the present invention, the method may further include: deleting the reservation information of the current session. Specifically, in a procedure of processing the second CCR message of the current session, for example, the second CCR message may be the first CCR Update message or CCR Termination message, that is, after step 105, the OCS deletes the reservation information of the current session after receiving the CCR Termination message sent by the service control point. Afterward, when user A initiates a call to other users, and the OCS creates a new session, no conflicting session is detected; and the reservation information of abnormal sessions (for example, those session where the timeout occurs because no CCR Termination message is reported after the charging for the session is performed for at least one time, and a CCR/CCA Update message is exchanged) may be avoided being deleted mistakenly. Such reservation information needs to be retained and is processed by an exception processing mechanism. When a CCR/CCA Update message is exchanged once in a session, it indicates that a call is set up, and a fee is generated. If the session is abnormal later (for example, timeout is caused by that no CCR Termination message is reported), the reserved service unit corresponding to this session should be released by this session using an exception processing mechanism (such as a timeout processing mechanism) of the session. That is, if the OCS receives a CCR Termination message sent by the service control point after a CCR/CCA Update message is exchanged once in a session, the reservation information of the session needs to be deleted; if the OCS receives no CCR Termination message sent by the service control point after a CCR/CCA Update message is exchanged once in the session, the reserved service unit corresponding to this session should be released by this session using an exception processing mechanism.

According to the method for releasing resources provided in the embodiment of the present invention, conflicting sessions are detected before a service unit is reserved for the current session. If a conflicting session is detected, the reserved service unit of the conflicting session is cleared, and a service unit is reserved for the current session. The reservation information of the current session is stored, so as to facilitate conflicting session detection for the next session. According to the technical solution provided in the embodiment of the present invention, when a user initiates multiple calls continuously, the reserved service unit of the conflicting session is released in time, so that the current session can be put through smoothly, and the user satisfaction is improved.

Figure 3:
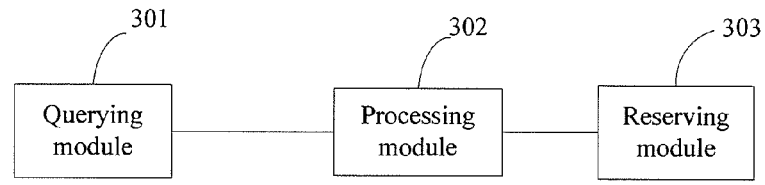
FIG. 3 is a block diagram of an apparatus for releasing resources according to an embodiment of the present invention.

As shown in FIG. 3, an embodiment of the present invention provides an apparatus for releasing resources, where the apparatus includes a querying module 301, a processing module 302, and a reserving module 303.

For example, in a procedure of processing the first CCR Initial message, the querying module 301 queries the reservation record according to the information about the current session. The processing module 302 judges whether a reservation record exists according to a query result of the querying module 301; judges whether a conflicting session exists according to reservation information in the reservation record if the reservation record exists; obtains reservation information of the conflicting session if the conflicting session exists; and releases a corresponding reserved service unit according to the reservation information of the conflicting session. The reserving module 303 is configured to reserve a service unit for the current session, store reservation information of the current session, and form a reservation record for the current session if the querying module 301 finds no reservation record, or if the processing module 302 judges that no conflicting session exists, or if the processing module 302 releases the corresponding reserved service unit.

In a specific example, the information about the current session may include a user identifier of the current session. The querying module 301 is specifically configured to query the reservation record according to the user identifier of the current session. The reservation information may include event service characteristics. The processing module 302 is specifically configured to judge whether a conflicting session exists according to the event service characteristics of the current session and the event service characteristics in the obtained reservation record.

Figure 4:
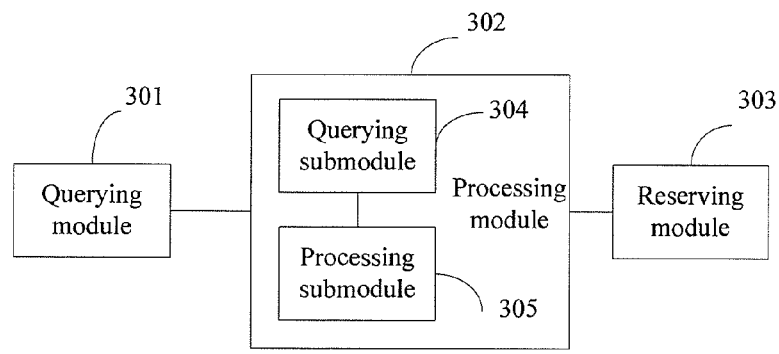
FIG. 4 is a block diagram of another apparatus for releasing resource according to an embodiment of the present invention.

In another apparatus embodiment for releasing resources, as shown in FIG. 4, the processing module 302 may include a querying submodule 304 and a processing submodule 305.

The querying submodule 304 is configured to obtain event service characteristics in the reservation record if the reservation record exists, and judge whether a conflicting session exists according to the event service characteristics of the current session and the event service characteristics in the obtained reservation record. A specific judging method is the same as those judging methods described in the method embodiments above.

The querying submodule 304 may further obtain a next reservation record for judgment until the last reservation record if no conflicting session exists.

The querying submodule 305, according to a query result of querying submodule 304 indicating that a conflicting session exists, obtains the reservation information of the conflicting session, and releases the service unit reserved for the conflicting session. Specifically, the service unit reserved for the conflicting session is released according to the reservation transaction identifier in the reservation information.

The reserving module 303 reserves a service unit for the current session, stores reservation information of the current session, and forms a reservation record for the current session if the querying module 301 judges that no reservation record exists, or if a judgment result of the querying submodule 304 indicates that a conflicting session not exists, or if the processing submodule 305 releases the service unit reserved for the conflicting session.

Figure 5:
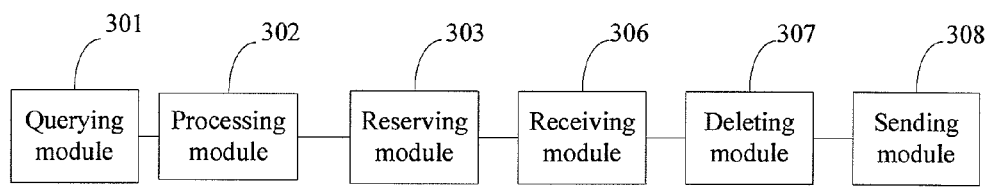
FIG. 5 is a block diagram of yet another apparatus for releasing resources according to an embodiment of the present invention.

In another apparatus embodiment for releasing resources, as shown in FIG. 5, on the basis of the preceding apparatus embodiment, the apparatus may further include a receiving module 306 and a deleting module 307. The receiving module 306 is configured to receive a CCR Termination message sent by the service control point in the second CCR message (for example, it may be the first CCR Update message or CCR Termination message) procedure of the session after the reserving module 303 forms a reservation record for the current session.

The deleting module 307 is configured to delete the reservation information (including the identifier of user A, event service characteristics, and reservation transaction identifier) of the current session stored by the reserving module 303 after the receiving module 306 receives the CCR Termination message sent by the service control point. On the basis of the embodiment, in another specific example, a sending module 308 is further included, which is configured to return a CCA Termination message to the service control point after the deleting module 307 deletes the reservation information of the current session stored by the reserving module 303.

It should be noted that, the division of functional modules in the above embodiments of an apparatus for releasing resources are merely examples for illustrations. In practical applications, depending on the requirements such as hardware configuration requirements or software implementation convenience, the above functions may be fulfilled by different functional modules. That is, the internal structure of the apparatus for releasing resources is divided into different functional modules, so as to fulfill all or part of the functions described above. In practical applications, the corresponding functional modules in the embodiment may be implemented by corresponding hardware, or may be implemented by an existing hardware apparatus executing corresponding software. For example, the querying module 301 may be hardware capable of executing the functions described above, such as a searcher, or may be a search processing unit or processor capable of executing the functions described above; and the processing module 302 may be a specific processor CPU capable of executing the functions described above, or a general processor capable of executing the corresponding computer programs to fulfill the functions described above, or a relevant hardware device.

According to the apparatus for releasing resources provided in the embodiment of the present invention, conflicting sessions are detected before a service unit is reserved for the current session. If a conflicting session is detected, the reserved service unit of the conflicting session is cleared, and a service unit is reserved for the current session. The reservation information of the current session is stored, so as to facilitate conflicting session detection for the next session. According to the technical solution provided in the embodiment of the present invention, when a user initiates multiple calls continuously, the reserved service unit of the conflicting session is released in time, so that the current session can be put through smoothly, and the user satisfaction is improved.

Figure 6:
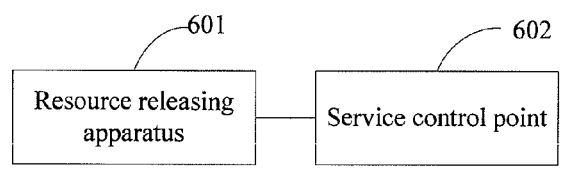
FIG. 6 is a block diagram of a system for releasing resources according to an embodiment of the present invention.

As shown in FIG. 6, an embodiment of the present invention provides a resource releasing system, where the system includes:

a resource releasing apparatus 601, configured to: query a reservation record according to information about a current session after receiving a CCR message sent by an service control point 602; judge whether a reservation record exists according to a result of the query; judge whether a conflicting session exists according to reservation information in the reservation record if the reservation record exists; obtain reservation information of the conflicting session if the conflicting session exists, and release a corresponding reserved service unit according to the reservation information of the conflicting session; and reserve a service unit for the current session, store reservation information of the current session, and form a reservation record for the current session if no reservation record exists or no conflicting session exists or the corresponding reserved service unit is released; and the service control point 602, configured to send the CCR message to the resource releasing apparatus 601 according to a session initiated by a user, and control the current session according to a credit control result returned by the resource releasing apparatus 601 (for a specific process of controlling the session according to the credit control result, reference is made to the general control procedure processing in the prior art). In a specific example, the credit control result message may be a CCR Initial message.

In another embodiment, the service control point 602 is further configured to send a CCR Termination message to the resource releasing apparatus 601. The resource releasing apparatus 601 is further configured to delete the stored reservation information of the current session after receiving the CCR Termination message sent by the service control point 602. On the basis of this embodiment, the resource releasing apparatus 601 is further configured to return a CCA Termination message to the service control point 602 after deleting the stored reservation information of the current session. Accordingly, the service control point 602 is further configured to receive the credit control termination response message returned by the resource releasing apparatus 601 after the resource releasing apparatus 601 deletes the stored reservation information of the current session.

In the examples above, the resource releasing apparatus 601 may be an online charging system OCS or other charging processing apparatuses.

It should be noted that, the resource releasing apparatus 601 included in the above system embodiment for releasing resources may be any embodiment of the apparatus for releasing resources described above.

Figure 7:
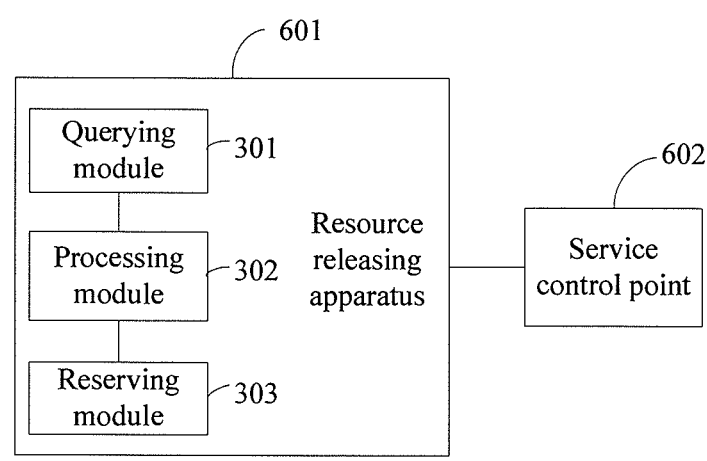
FIG. 7 is a block diagram of another system for releasing resources according to an embodiment of the present invention.

As shown in FIG. 7, the resource releasing apparatus 601 in the system includes a querying module 301, a processing module 302, and a reserving module 303.

In a procedure of processing the first CCR Initial message of a session, the querying module 301 queries the reservation record according to the information about the current session. The processing module 302 judges whether a reservation record exists according to a query result of the querying module 301, judges whether a conflicting session exists according to reservation information in the reservation record if the reservation record exists, obtains reservation information of the conflicting session if the conflicting session exists, and releases a corresponding reserved service unit according to the reservation information of the conflicting session. The reserving module 303 is configured to reserve a service unit for the current session, store reservation information of the current session, and form a reservation record for the current session if the querying module 301 finds no reservation record, or if the processing module 302 judges that no conflicting session exists, or if the processing module 302 releases the corresponding reserved service unit.

According to the system for releasing resources provided in the embodiment of the present invention, conflicting sessions are detected before a service unit is reserved for the current session. If a conflicting session is detected, the reserved service unit of the conflicting session is cleared, and a service unit is reserved for the current session. The reservation information of the current session is stored, so as to facilitate conflicting session detection for the next session. According to the technical solution provided in the embodiment of the present invention, when a user initiates multiple calls continuously, the reserved service unit of the conflicting session is released in time, so that the current session can be put through smoothly, and the user satisfaction is improved.

Through the description of the foregoing embodiments, those skilled in the art may clearly understand that the present invention may be implemented by hardware on a necessary universal hardware platform, and definitely may also be implemented by hardware, but in most cases, the present invention is preferably implemented through the former method. Based on such understanding, the technical solution of the present invention or the part that makes contributions to the prior art may be substantially embodied in the form of a software product. The computer software product may be stored in a readable storage medium, for example, a floppy disk, hard disk or optical disk of the computer, and include several instructions used to instruct an equipment (such as a personal computer, a server, or a network device) to perform the method according to the embodiments of the present invention.

Detailed above are only exemplary embodiments of the present invention, but the scope of the present invention is not limited thereto. Any modification or replacement readily conceivable by those skilled in the art within the technical scope disclosed in the present invention shall fall within the protection scope of the present invention. Therefore, the protection scope of the present invention is subject to the appended claims.

What is claimed is:

1. In a releasing resources apparatus, a method for releasing resources in an online charging process, the method comprising:
   querying a reservation record according to information about a current session when a user initiates multiple calls continuously;
   judging whether a reservation record exists according to a result of the query;
   judging whether a conflicting session exists according to reservation information in the reservation record if the reservation record exists;
   obtaining reservation information of the conflicting session if the conflicting session exists, and releasing a corresponding reserved service unit for the conflicting session in the account of the user according to the reservation information of the conflicting session; and
   reserving a service unit for the current session, storing reservation information of the current session, and forming a reservation record for the current session after the corresponding reserved service unit is released.

2. The method for releasing resources according to claim 1, wherein:
   the information about the current session comprises a user identifier of the current session;
   the querying the reservation record according to the information about the current session comprises:
   querying the reservation record according to the user identifier of the current session.

3. The method for releasing resources according to claim 1, wherein:
   the reservation information comprises event service characteristics; and
   the judging whether a conflicting session exists according to reservation information in the reservation record comprises:
   judging whether a conflicting session exists according to event service characteristics of the current session and event service characteristics in the reservation record.

4. The method for releasing resources according to claim 3, wherein:
   the judging whether a conflicting session exists according to event service characteristics of the current session and event service characteristics in the reservation record comprises:
   obtaining the event service characteristics in the reservation record, querying an event service characteristics conflict table according to the event service characteristics of the current session and the event service characteristics in the reservation record, and determining whether a conflicting session exists according to a returned result of the query.

5. The method for releasing resources according to claim 3, wherein:
the judging whether a conflicting session exists according to event service characteristics of the current session and event service characteristics in the reservation record comprises:
obtaining the event service characteristics in the reservation record; and judging that a conflicting session exists if the event service characteristics of the current session are the same as the event service characteristics in the reservation record.

6. The method for releasing resources according to claim 5, further comprising:
obtaining a next reservation record if a judgment result is that no conflicting session exists, and judging whether a conflicting session exists according to the event service characteristics of the current session and the event service characteristics in the obtained next reservation record.

7. The method for releasing resources according to claim 1, wherein:
after forming a reservation record for the current session, the method further comprises:
deleting stored reservation information of the current session after receiving a credit control request termination message sent by a service control point.

8. An apparatus for releasing resources in an online charging process, the apparatus comprising a processor and a non-transitory computer readable medium, wherein the computer readable medium further comprises:
a querying module, configured to query a reservation record according to information about a current session when a user initiates multiple calls continuously;
a processing module, configured to: judge whether a reservation record exists according to a query result of the querying module; judge whether a conflicting session exists according to reservation information in the reservation record if the reservation record exists; obtain reservation information of the conflicting session if the conflicting session exists; and release a corresponding reserved service unit for the conflicting session in the account of the user according to the reservation information of the conflicting session; and
a reserving module, configured to reserve a service unit for the current session, store reservation information of the current session, and form a reservation record for the current session after the processing module releases the corresponding reserved service unit.

9. The apparatus for releasing resources according to claim 8, wherein:
the information about the current session comprises a user identifier of the current session; and
the querying module is configured to query the reservation record according to the user identifier of the current session.

10. The apparatus for releasing resources according to claim 8, wherein:
the reservation information comprises event service characteristics; and
the processing module is configured to judge whether a conflicting session exists according to event service characteristics of the current session and event service characteristics in the reservation record.

11. The apparatus for releasing resources according to claim 10, wherein the processing module comprises:
a querying submodule, configured to obtain event service characteristics in the reservation record if the reservation record exists, and judge whether a conflicting session exists according to the event service characteristics of the current session and the event service characteristics in the reservation record; and
a processing submodule, configured to obtain the reservation information of the conflicting session and release the service unit reserved for the conflicting session when a judgment result of the querying submodule is that the conflicting session exists.

12. The apparatus for releasing resources according to claim 10, wherein the apparatus further comprises:
a receiving module, configured to receive a credit control request termination message sent by a service control point; and
a deleting module, configured to delete the reservation information of the current session stored by the reserving module after the receiving module receives the credit control request termination message sent by the service control point.

13. A system for releasing resources in an online charging process, the system comprising a resource releasing apparatus and a service control point, wherein:
the resource releasing apparatus comprises a processor and a non-transitory computer readable medium, wherein the computer readable medium is configured to: query a reservation record according to information about a current session after receiving a credit control request message sent by the service control point when a user initiates multiple calls continuously; judge whether a reservation record exists according to a result of the query; judge whether a conflicting session exists according to reservation information in the reservation record if the reservation record exists; obtain reservation information of the conflicting session if the conflicting session exists, and release a corresponding reserved service unit for the conflicting session in the account of the user according to the reservation information of the conflicting session; and reserve a service unit for the current session, store reservation infoimation of the current session, and form a reservation record for the current session after the corresponding reserved service unit is released; and
the service control point comprising a processor and a non-transient computer readable medium, is configured to send a credit control result message to the resource releasing apparatus according to a session initiated by a user, and control the current session according to the credit control result message returned by the resource releasing apparatus.

14. The system for releasing resources according to claim 13, wherein:
the service control point is further configured to send a credit control point termination message to the resource releasing apparatus; and
the resource releasing apparatus is further configured to delete the stored reservation information of the current session after receiving the credit control point termination message sent by the service control point.

* * * * *

UNITED STATES PATENT AND TRADEMARK OFFICE
CERTIFICATE OF CORRECTION

PATENT NO.         : 8,489,756 B2                                                                Page 1 of 1
APPLICATION NO.    : 13/361380
DATED              : July 16, 2013
INVENTOR(S)        : Changjiu Xu It is certified that error appears in the above-identified patent and that said Letters Patent is hereby corrected as shown below:

In the Claims

Column 12, Claim 13, line 45, delete "infoimation" and insert -- information --.

Signed and Sealed this
Twenty-eighth Day of October, 2014

Michelle K. Lee
*Deputy Director of the United States Patent and Trademark Office*